May 22, 1951     A. J. WETTELS     2,554,436
GEARED ACTUATOR
Filed May 9, 1946
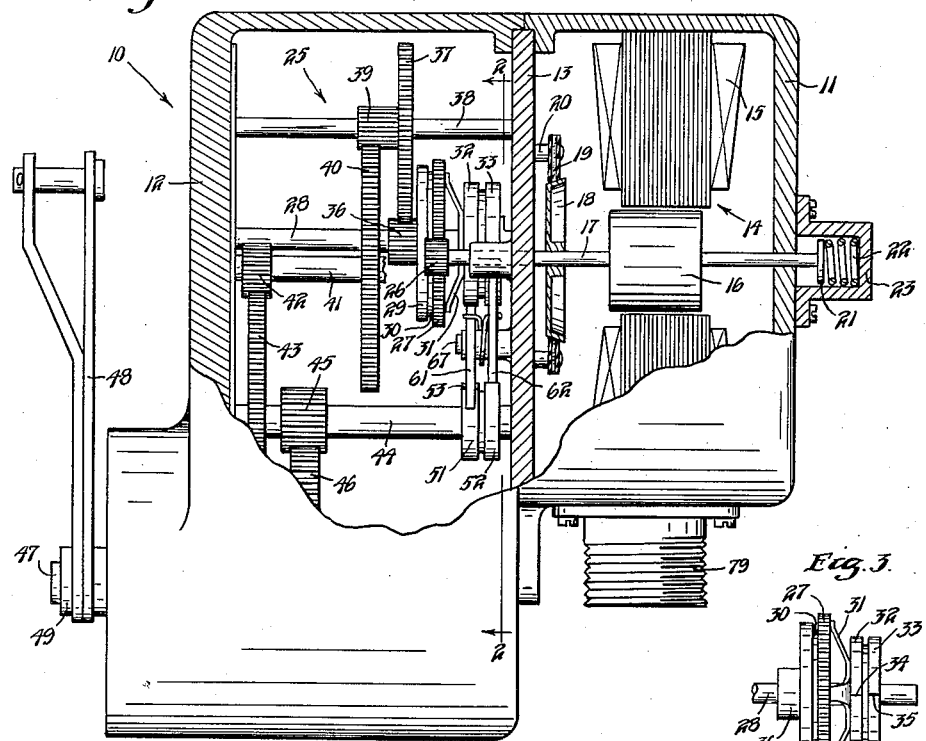
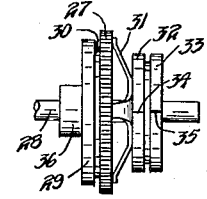
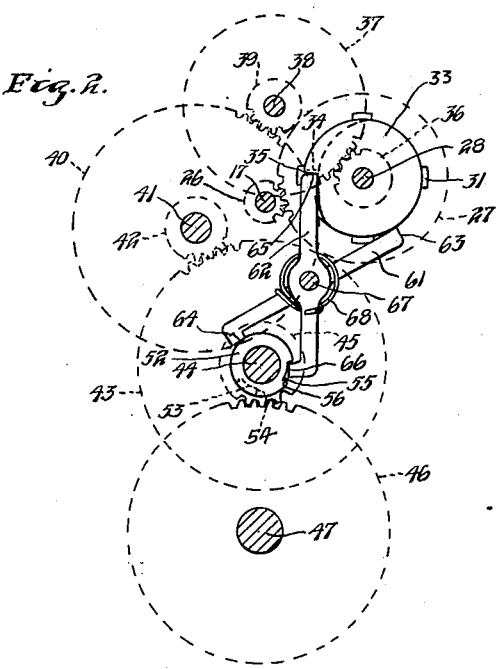
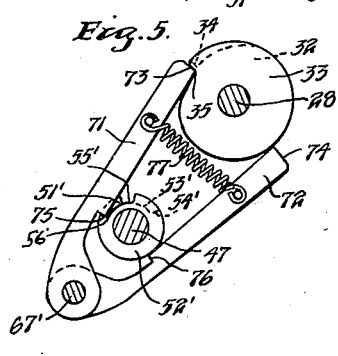
INVENTOR.
ALBERT J. WETTELS
BY
George H. Fisher
ATTORNEY Patented May 22, 1951

2,554,436

UNITED STATES PATENT OFFICE 2,554,436

GEARED ACTUATOR

Albert J. Wettels, Minneapolis, Minn., assignor to Minneapolis-Honeywell Regulator Company, Minneapolis, Minn., a corporation of Delaware Application May 9, 1946, Serial No. 668,529

13 Claims. (Cl. 192—4)

The present invention relates to positive stop means for a geared motor driven actuator.

Mechanical stop means have long been used to limit the rotation of the main or output shaft of motor driven actuators and have performed satisfactorily when used with small and relatively low speed motors. However, when the prior art stop means are applied to the more powerful actuators driven by high speed motors, through speed reducing power transmission means such as a gear train excessive stresses result with consequent damage to the gear train and other parts of the device. The present invention overcomes these difficulties by using cam means driven by the gear train near its output end to actuate stop means effective against abutment means rotated by the said gear train near its input or motor driven end. By stopping the gear train at a point where the torque is low, stresses are kept low and damage is prevented.

It is therefore a principal object of this invention to provide improved stop means for a motor driven geared actuator.

It is also an object to provide positive stop means for a geared actuator which is actuated by the gear train near its output end but is effective near the driven end of the said gear train.

It is a further object to provide improved means for positively stopping rotation of a motor means without subjecting the means to excessive stresses.

It is an additional object to provide stop means effective to stop the gear train of a geared actuator and to provide torque limiting clutch means to minimize the stress in the said stop means.

It is also an object to provide geared motor means with improved means for positively limiting rotation in at least one direction and to provide friction means for preventing rotation when the motor is deenergized in either direction.

It is a further object to provide geared motor driven actuator means with positive stop means so arranged that the effect of the inertia forces of the gear train and the motor are minimized.

It is also an object to provide stop means for a geared motor driven actuator which is easy to manufacture and dependable in service.

It is a further object to provide stop means for a gear train which is readily adapted to varying arrangements of the said gear train.

These and other objects will become apparent upon a study of the following specification and drawings wherein:

Figure 1 is a side elevation of the present motor driven actuator, with parts in section.

Figure 2 is a schematic representation of the gear train and stop means as viewed from the line 2—2 of Figure 1.

Figure 3 is an elevation view of the stop cam and the friction clutch shown in Figure 1.

Figure 4 is an elevation view of the actuating cams of Figure 1, slightly rotated.

Figure 5 is a schematic representation of a modified stop means.

The present actuator, best shown in Figure 1, is especially designed for use in aircraft for actuating valves, dampers, flaps and the like requiring limited travel and in consequence is made as light as possible consistent with dependability and its power demands. Actuator 10 includes a motor housing 11 secured to gear housing 12 by means not shown. A partition 13 is properly located and held in place by rabbet means near the junction line of housings 11 and 12, the said partition 13 separating the motor compartment from the gear compartment.

Motor 14, located within housing 11, is preferably a two phase induction motor and includes field coils 15 secured to housing 11. An armature or rotor 16, preferably with herringbone or skewed slots, is attached to shaft 17 and located within the influence of the field coils 15. A brake drum 18, also mounted on shaft 17 has conical braking surfaces and is shown in engagement with a brake ring comprising a ring of suitable friction material, such as a cork-synthetic rubber composition or the like, held between two metal rings and secured as at 20 to partition 13. Brake drum 18 is normally held in engagement with braking means 19 and armature or rotor 16 is slightly to the left of its magnetic center due to the thrust exerted by spring 22 on shaft 17 through plate 21, the spring being held in place by a cap means 23 which is suitably secured to housing 11. Spring 22 exerts a force such that the armature 16 and disk 18 is normally held against rotation when one phase of the motor is not energized but wherein, upon energization of both phases of the motor, the tendency of armature 16 to gain its magnetic center is sufficient to overcome spring 22, drum 18 is moved out of engagement with braking means 19 and motor 14 operates a speed reducing power transmission means which herein is gear train 25 through pinion 26 carried on the left end of shaft 17.

Pinion 26 at the high speed, low torque end of gear train 25 engages gear 27 on shaft 28, which gear is rotatable relative to shaft 28 but is normally prevented from turning relative to the said shaft by torque limiting clutch means comprising plate 29 secured to shaft 28, friction disk 30 arranged between plate 29 and gear 27, and spring means 31 which compresses disk 30 between gear 27 and plate 29. A pair of spaced stop cams 32 and 33 are also attached to shaft 28 and form the point of reaction for spring 31. Stop cam 32 has an abutment face, or ratchet tooth, 34 facing upwardly in Figure 3, and cam 33 has a similar face, or ratchet tooth, 35 facing downwardly in the same figure. The purpose of these stop faces will become apparent as the description proceeds.

In addition to the above mechanism, pinion 36 is also connected to shaft 28 and engages gear 37 carried on shaft 38. Pinion 39 on the said shaft 38 engages gear 40 carried by shaft 41, the right end of shaft 41 being cut away to render the drawing less confusing. A pinion 42 secured to shaft 41 engages gear 43 mounted on shaft 44. A pinion 45 secured to shaft 44 engages gear 46 which drives main or output shaft 47 to which is secured operating arm 48, the said operating arm 48 being preferably prevented from rotating relative to shaft 47 by splines or the like, not shown. Any conventional fastening means such as nut 49 may be used to prevent removal of arm 48 from the said shaft. Shaft 47 is thus the main output shaft or the low speed high torque end of the present actuator device. In addition to pinion 45 and gear 43, actuating cams 51 and 52 are also mounted on shaft 44. Cams 51 and 52 have cylindrical surfaces with the exception of recesses 53 and 55, respectively, the said recesses being bounded at their adjacent ends by drop off faces 54 and 56, respectively. In the present instance, drop off faces 54 and 56 are approximately 300 angular degrees apart in their functional relation.

A pair of crossed, pivotally mounted lever means 61 and 62 are located between cams 32—33 and 51—52. Lever 61 is in alignment with cam 51 and cam 32, whereas lever 62 is in alignment with cam 33 and cam 33. Lever 61 has an abutting portion 63 and a follower portion 64, while lever 62 has an abutting portion 65 and a follower portion 66. These crossed levers are pivotally mounted on a stub shaft 67 attached to partition 13, the said shaft being aligned with and located between shafts 28 and 44. Follower portions 64 and 66 of levers 61 and 62, respectively, are urged against cams 51 and 52, respectively, by spring means 68. The purpose and function of these levers will be made more clear in the description of the operation of the present mechanism.

It was previously noted that drop off faces 54 and 56 of cams 51 and 52, respectively, were located 300 angular degrees apart. It should be further noted that this angularity has worked well in the present commercial embodiment of this apparatus wherein the gear train is proportioned as follows: 12 teeth on pinion 26, 60 teeth on gear 27, 14 teeth on pinion 36, 70 teeth on gear 37, 14 teeth on pinion 39, 72 teeth on gear 40, 15 teeth on pinion 42, 63 teeth on gear 43, 15 teeth on pinion 45, and 50 teeth on gear 46. Calculation will reveal that the overall reduction of the present gear train is 1800 to 1 and the reduction between shafts 28 and 44 is 108 to 1. In addition, the reduction between shafts 44 and output shaft 47 is 3⅓ to 1. As will be later described, with a 3⅓ to 1 ratio between shafts 44 and output shaft 47, shaft 47 will rotate 90 degrees while shaft 44 rotates 300 degrees. In this present example, motor 14 operates at about 10,000 R. P. M. and output shaft 47 can rotate through its 90 degree travel in about 2.6 seconds.

While the actual stopping of the present gear train takes place at one step removed from the motor, and the actuation of the stop means is one step removed from the output shaft, it is obvious that the actuation can be from the output shaft itself and the stopping can be on the motor shaft itself, if desired. In the present instance, it was found more convenient and entirely satisfactory to locate the stop means as shown. It will be noted that levers 61 and 62 are crossed because cams 51—52 and 32—33 rotate in opposite directions. If these cams rotated in the same direction, then a different arrangement of the stop levers would be called for.

As an example of a modification to be used where the shafts operate in the same direction, attention is directed to Figure 5 which illustrates another commercial embodiment of the present invention. Only the stop cams and actuating cams, as well as the levers, are shown in this modification but it is intended that a suitable gear train be arranged between these members as in the preceding example. It is convenient to assume that stop cams 32—33 of this fiigure are the same as those previously shown, hence the same numbering is used on them, the said cams being carried on shaft 28. These cams have abutment faces 34 and 35 as in the preceding example and it is further assumed that shaft 28 is one step removed from the motor driving means. However, so that the shaft carrying the actuating means will be rotated in the same direction as shaft 28, it may be assumed that actuating cams 51' and 52' are secured to output shaft 47 and therefore rotate in the same direction as shaft 28. Acuating cams 51' and 52' are generally similar to the aforementioned actuating cams excepting that they have somewhat longer recess portions 53' and 55' and drop off faces 54' and 56' are much closer together so that each of levers 71 and 72 can be actuated with 90 degrees rotation of shaft 47. Lever means 71 and 72 have abutment faces 73 and 74 and follower portions 75 and 76, respectively. Levers 71 and 72 are pivoted on a stub shaft 67' located in alignment with but spaced from the plane defined by shafts 28 and 47, as shown in Figure 5. Follower portions 75 and 76 are held in engagement with their respective cams 51' and 52' by a tension spring means 77.

Motor 14 is connected to controlling electrical circuits through an AN connector 79, the circuits normally being controlled by an electronic amplifier such as that disclosed in the copending application of Albert P. Upton, Serial No. 437,561, filed April 3, 1942, now Patent No. 2,423,534.

To better illustrate the present invention, the operation of the present mechanism will now be described.

Operation

In Figure 1, device 10 is shown in its partially deenergized condition and, by referring to Figure 2, it will be noted that main or output shaft 47 has been rotated to one of its extreme positions. Assuming that pinion 26 was rotating clockwise when shaft 47 was moved to its extreme, then shaft 47 would be driven in a counterclockwise direction, hence it is now in its extreme counterclockwise position. Further, since the motor is partially deenergized, armature or rotor 16 is pushed to the left of its magnetic center by spring 22 and brake drum 18 is in engagement with friction ring 19.

If it now be assumed that motor means 14 is energized for rotation in a direction opposite to its previous energization, so that pinion 26 will rotate counterclockwise, it will be noted that armature 16 first moves to the right to its magnetic center position and thereby pulls brake drum 18 away from brake ring 19. Rotation is then permitted and operating arm 48 is driven in a clockwise direction. With pinion 26 rotating counterclockwise, abutment face 35 of cam 33 moves away from portion 65 of lever 62 and the said lever is forced outwardly by the said cam sufficiently to force follower portion 66 out of recess 55 of cam 52. Actuating cams 51 and 52 are rotated counterclockwise hence follower portions 64 and 66 will both ride on the cylindrical surfaces of the said cams until recess 53 passes under follower means 64 and permits abutment portion 63 to move against its stop cam 32 for engagement with abutment surface 34 of the said cam.

In the meantime, however, should the motor be partially deenergized because of the controlling action of its amplifier, or the like, armature 16 would then be moved to the left as before noted with brake drum 18 engaging brake ring 19 and preventing further rotation. This will prevent rotation of output lever 48 because the braking effort preventing rotation of pinion 26 is multiplied 1800 times by the gear train. With the present arrangement, a relatively small braking force is thus able to hold a considerable load on the output shaft.

However, should the motor continue rotating in its previous direction with pinion 26 rotating counterclockwise, this rotation will continue as before noted until follower portion 64 drops off face 54 into recess 53 of cam 51. Abutment portion 63 is then in a position to engage, and does engage, abutment face 34 of the cam 32, as before noted. Now, if motor means 14 is rotating at 10,000 R. P. M., as previously noted, shaft 28 which carries the stop cams 32 and 33 will be rotating at 2,000 R. P. M. This shaft will be abruptly stopped in the manner described hence it will appear that the inertia of the rapidly revolving motor may cause a considerable shock. However, because motor means 14 transmits its effort to shaft 28 through gear 27 and friction disk 30, shaft 28 can be abruptly stopped and the shock is minimized by slipping of gear 27 relative to plate 29 due to the aforementioned clutch means. Therefore, the forces to be handled by levers 61 and 62 in stopping the gear train are the limiting torque permitted by the clutch means and the inertia of the gear train itself. However, since the speed at shaft 28 has been reduced to 2,000 R. P. M. and the speed at shaft 38 is further reduced to 400 R. P. M., with additional reductions in speed through the rest of the gear train, the inertia forces of the gear train itself are not large and are easily handled by the present stop means. While 300 degrees of rotation are required of shaft 44 before follower 64 can drop into recess 53 of cam 51, only 90 degrees of rotation takes place at shaft 47 due to the aforementioned 3⅓ to 1 gear reduction between shafts 44 and 47. Thus, when abutment portion 63 engages abutment face 34 of cam 32 and brings the gear train to a stop, arm 48 and shaft 47 will be in their extreme clockwise position and 90 degrees removed from the aforementioned extreme position.

The operation of the mechanism in Figure 5 is quite similar to that just described. In the position shown, shaft 74 may be assumed to have rotated to its extreme counterclockwise direction so that follower portion 75 of lever 71 fell off drop off portion 56' of cam 52' and thus permitted portion 73 of lever 71 to engage stop face 35 of cam 33. This prevents further rotation of shaft 28 in a counterclockwise direction, as will be obvious. If it now be considered that the motor means which drives this apparatus is oppositely energized and rotates shaft 28 in a clockwise direction, it will be noted that lever 71 is cammed outwardly by stop cam 33 thus forcing follower portion 75 away from cam 52'. While it might appear that face 56' of cam 52' would engage lever 71 and prevent clockwise rotation of shafts 47 and 28, it is noted that the very considerable gear reduction between shafts 28 and 47 permits considerable rotation of shaft 28 with only slight movement at shaft 47. In practice, this gives no difficulty. Rotation being started in a clockwise direction, it will continue until the motor is partially deenergized as in the previous example, or until recess 53' of cam 51' passes under follower portion 76 of lever 72 thereby permitting abutment portion 74 of lever 72 to be pulled into engagement with cam 32 so that it can engage abutment face 34 of the said cam and prevent further clockwise rotation. This will then prevent further clockwise rotation of shaft 47 due to the aforementioned gear train. Because shaft 47 in this example is the output shaft, it is noted that the drop off faces 56' and 54' are so located that only the required angular rotation of shaft 47 is permitted, in this case 90 degrees. This will be seen by inspecting Figure 5 wherein it will be noted that when shaft 47 rotates approximately 90 degrees, drop off face 54' will then pass under follower portion 76 of lever 72. It should be noted that the limiting rotation described in these examples is illustrative only, 90 degrees being chosen because the operating arms of the present actuators are commonly limited to 90 degrees rotation. Obviously, by shifting cams 51 and 52, or 51' and 52', relative to each other, any desired angular rotation may be had in accordance with the present invention.

A study of the present disclosure will suggest many substitutions and equivalents hence it is emphasized that the present disclosure is to be considered as illustrative only and with the scope of the present invention being determined by the appended claims.

I claim:

1. In an actuating device, motor means including an armature, an output shaft for said device, a torque increasing gear train including a plurality of gears connected between said armature and said output shaft so that said shaft has a high output torque compared to said armature, means for braking said armature when the said motor means is deenergized, oppositely arranged ratchet tooth means connected to said gear train for low torque and relatively high speed operation thereby, cam means driven by a portion of the gear train which operates at relatively high torque and low speed, friction clutch means arranged in said gear train between said armature and said ratchet tooth means, a pair of crossed pivoted levers each having a follower portion and an abutting portion and arranged in straddling relation to said cam means and said ratchet tooth means, said cam means including circular portions and recess portions, and means urging the said follower portions against said cam means, said lever means being proportioned and arranged so that the abutting portions of said levers clear said ratchet tooth means when the said follower portions are engaging the circular portions of said cam means but wherein an abutting portion engages a ratchet tooth means and prevents further rotation in one direction of said gear train when the respective follower means engages a recess portion of said cam means, said friction clutch means preventing undue shock on the gear train when the ratchet tooth means is suddenly stopped.

2. In an actuating device, motor means including an armature, an output shaft for said device, a speed reducing gear train including a plurality of pairs of gears connected between said armature and said output shaft so that said shaft is driven at a relatively low speed by said armature, oppositely arranged ratchet tooth means connected to said gear train for relatively high speed rotation thereby, cam means connected to said gear train for relatively low speed rotation thereby, a pair of lever means arranged in straddling relation to said cam means and ratchet tooth means, said cam means including actuating portions for operating one or the other of said lever means, and means for holding said lever means in engagement with said cam means, each of said lever means also including a portion for engaging one of said ratchet tooth means when said lever means is actuated by one of said cam operating portions but which is normally held out of engagement with said ratchet tooth means by said cam means, the engagement of said lever means with said ratchet tooth means limiting operation of said gear train and thus limiting rotation of said output shaft.

3. In an actuating device, motor means including an armature, an output shaft, a gear train comprising a plurality of pairs of gears for driving said output shaft at a speed less than that of said armature, oppositely arranged ratchet means driven by said gear train at a relatively high speed, cam means driven by said gear train at a relatively low speed, said cam means having dwell portions and a pair of depressed portions, spring means, crossed lever means having inwardly directed follower means urged against opposite sides of said cam means by said spring means, and said lever means having ratchet engaging portions held out of engagement with said ratchet means when said follower means engages the dwell portions of the cam means but wherein one of said engaging portions engages said ratchet means and prevents further rotation in one direction of said ratchet means and gear train when its respective follower means engages a depressed portion of said cam means.

4. In an actuating device, motor means including an armature, an output shaft for said device, a plurality of speed reducing gears connecting said armature to said output shaft so that said shaft will be driven with relatively high torque and low speed as compared to said armature, means including oppositely arranged axially displaced ratchet teeth connected to one of said gears for relatively high speed rotation thereby, cam means having cylindrical portions and angularly related axially displaced operating portions, a pair of levers pivotally mounted in straddling relation to said ratchet means and said cam means, each of said levers having a cam follower portion and a ratchet tooth abutting portion, said levers being arranged so that each lever is in rotative alignment with a ratchet tooth and a cam operating portion, and means for maintaining both of said follower portions in engagement with said cam means, said abutting portions clearing said ratchet teeth means when said follower portions are engaging said cylindrical portions and one or the other of said abutting portions engaging its aligned ratchet tooth means when its respective follower is displaced by an operating portion of said cam means to limit rotation of said gears and said output shaft.

5. In an actuating device, motor means including a rotor, said device including a main shaft, speed reducing power transmission means connecting said rotor to said main shaft, lever controlling and actuating means included in said power transmission means and located near one extremity thereof, means including an abutment included in said power transmission means and located near the opposite extremity thereof, and lever means controlled by said lever controlling and actuating means and including a stop portion engageable with said abutment means to stop said power transmission means and said main shaft when said lever is operated by said lever actuating means.

6. In an actuating device, motor means including a rotor, a main shaft for said device, speed reducing power transmission means connecting said rotor to said main shaft, said power transmission means including torque limiting means, means preventing operation of said power transmission means when said motor means is deenergized, means for controlling and actuating stop means connected in positive rotative relation with said main shaft and rotatable at a relatively low speed by said power transmission means, means including an abutment driven at relatively high speed by said power transmission means, and stop means controlled by said controlling and actuating means and including a portion engageable with said abutment means to stop said power transmission means and said main shaft when the said stop means is actuated.

7. In an actuating device, motor means including a rotor, a main shaft for said device, speed reducing power transmission means connecting said rotor to said main shaft, positive brake means included in said power transmission means for relatively high speed rotation thereby, control means included in said power transmission means for relatively low speed operation thereby, and mechanical means arranged for actuation by said control means for engaging said positive brake means for stopping operation of said power transmission means.

8. In a motor driven device, said motor including a rotor, an output shaft, speed reducing power transmission means connecting said rotor to said shaft for driving said shaft at a relatively low speed, positive brake means connected to said power transmission means for relatively high speed rotation thereby, control means connected to said power transmission means for relatively low speed operation thereby, said control means being positively related to said output shaft, and mechanical means controlled by said control means and capable of engaging said brake means, said mechanical means comprising a pair of pivoted lever means having portions engageable with said control means and other portions engageable with said brake means.

9. In a motor driven device, said motor including a rotor, an output shaft, speed reducing power transmission means connecting said rotor to said shaft for driving said shaft at a relatively low speed, positive brake means connected to said power transmission means for relatively high speed rotation thereby, control means connected to said power transmission means for relatively low speed operation thereby, said control means being positively related to said output shaft, and mechanical means controlled by said control means and capable of engaging said brake means, said mechanical means comprising a pair of pivoted lever means arranged in straddling relation to said control means and said brake means, said levers having inwardly directed follower portions bearing against said control means and having end portions engageable with said brake means, said levers being pivoted about an axis arranged between said brake means and said control means.

10. In a motor driven device, said motor including a rotor, an output shaft, speed reducing power transmission means connecting said rotor to said shaft for driving said shaft at a relatively low speed, positive brake means having an axis connected to said power transmission means for relatively high speed rotation thereby, control means having an axis connected to said power transmission means for relatively low speed operation thereby, said control means being positively related to said output shaft, and mechanical means controlled by said control means and capable of engaging said brake means, said mechanical means comprising a pair of pivoted lever means arranged in straddling relation to said control means and said brake means, said levers having inwardly directed follower portions bearing against said control means and having end portions engageable with said brake means, said levers being pivoted about an axis located on a continuation of a plane defined by the axes of said control means and said brake means.

11. In brake means for the gear train of an actuator, positive stop brake means mounted on and rotatably driven by an input end of the gear train, cam means mounted on and driven by an output end of the said gear train, and pivoted lever means having a portion for following said cam means and having another portion arranged to engage said positive stop means when properly actuated by said cam means.

12. In brake means for the gear train of an actuator, positive stop brake means mounted on and rotatably driven by a low torque end of the gear train, cam means mounted on and driven by a high torque end of the said gear train, and lever means having a portion arranged to engage said brake means for stopping rotation thereof and having another portion for bearing against said cam means and normally preventing engagement of the first named portion.

13. In stop means for a speed reducing gear train, said gear train having a high speed end and a low speed end, the said low speed end including an output shaft, rotatable ratchet tooth means mounted on said gear train near its high speed end, cam means mounted on the said output shaft, and pivoted lever means controlled by said cam means and arranged to engage said ratchet tooth means to prevent rotation thereof.

ALBERT J. WETTELS.

REFERENCES CITED

The following references are of record in the file of this patent:

UNITED STATES PATENTS

| Number | Name | Date |
|---|---|---|
| 2,285,414 | Collins | June 9, 1942 |
| 2,378,941 | May | June 26, 1945 |